June 2, 1953     E. S. DIEHL     2,640,306
STONE GATHERING MACHINE
Filed April 11, 1949     5 Sheets-Sheet 1
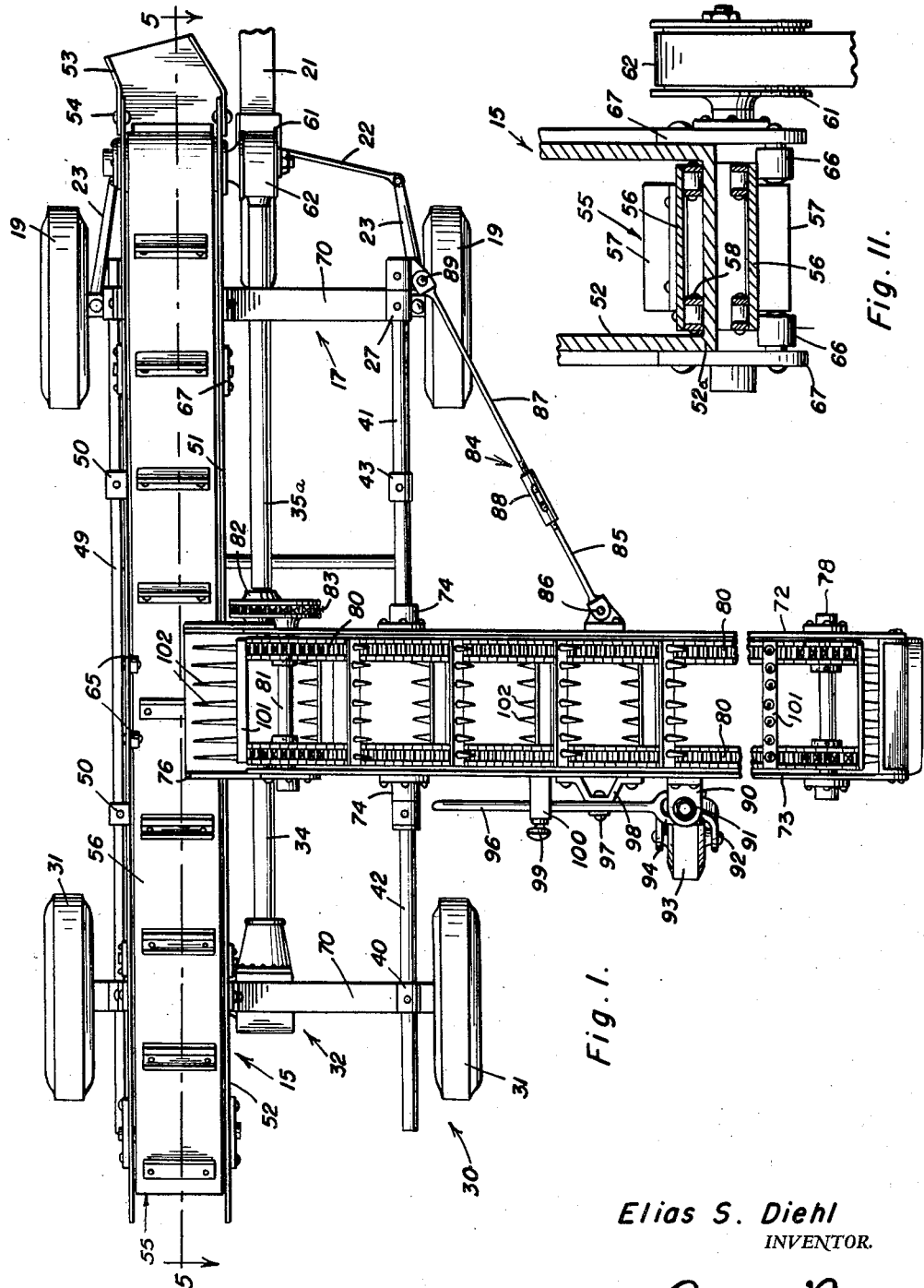
Elias S. Diehl
INVENTOR.

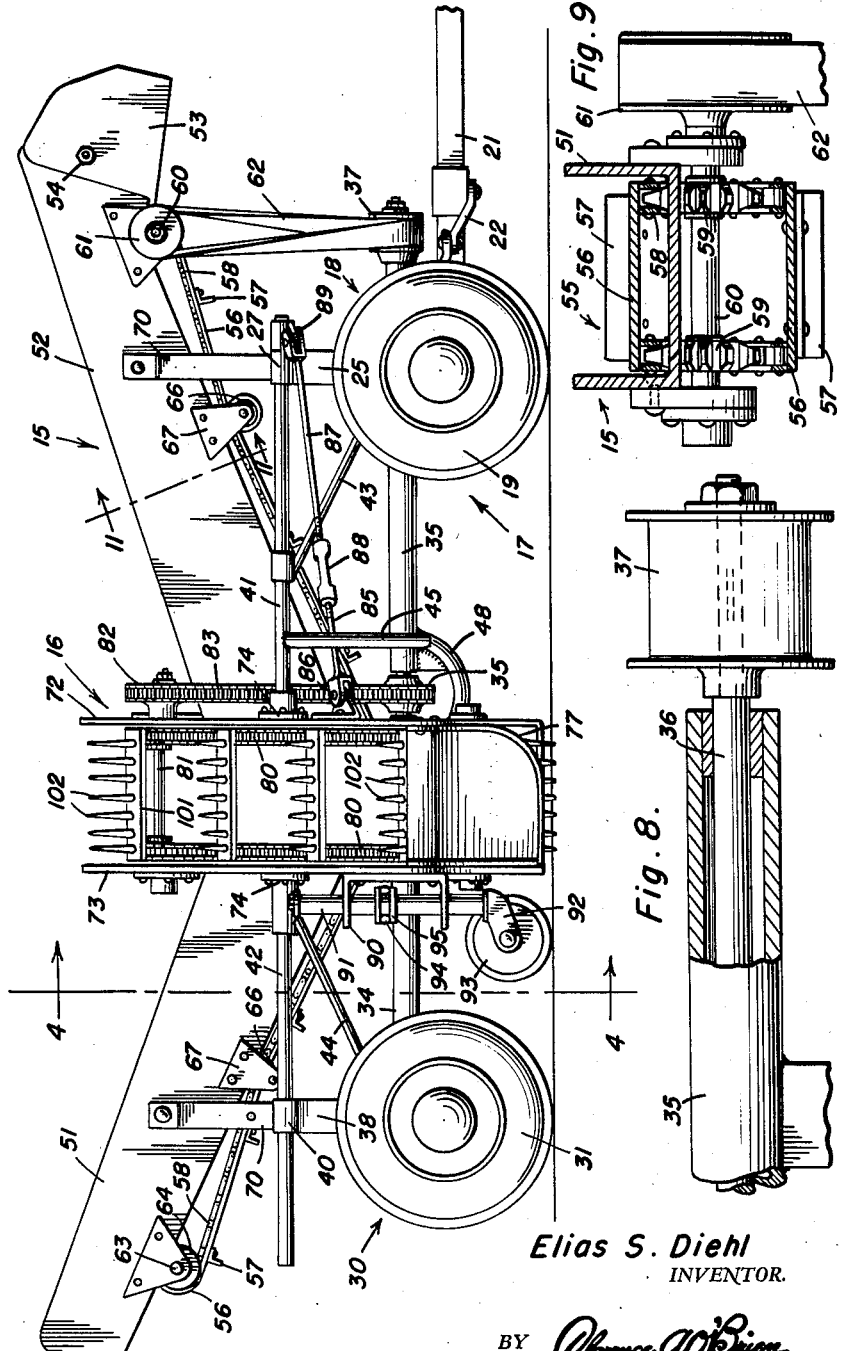

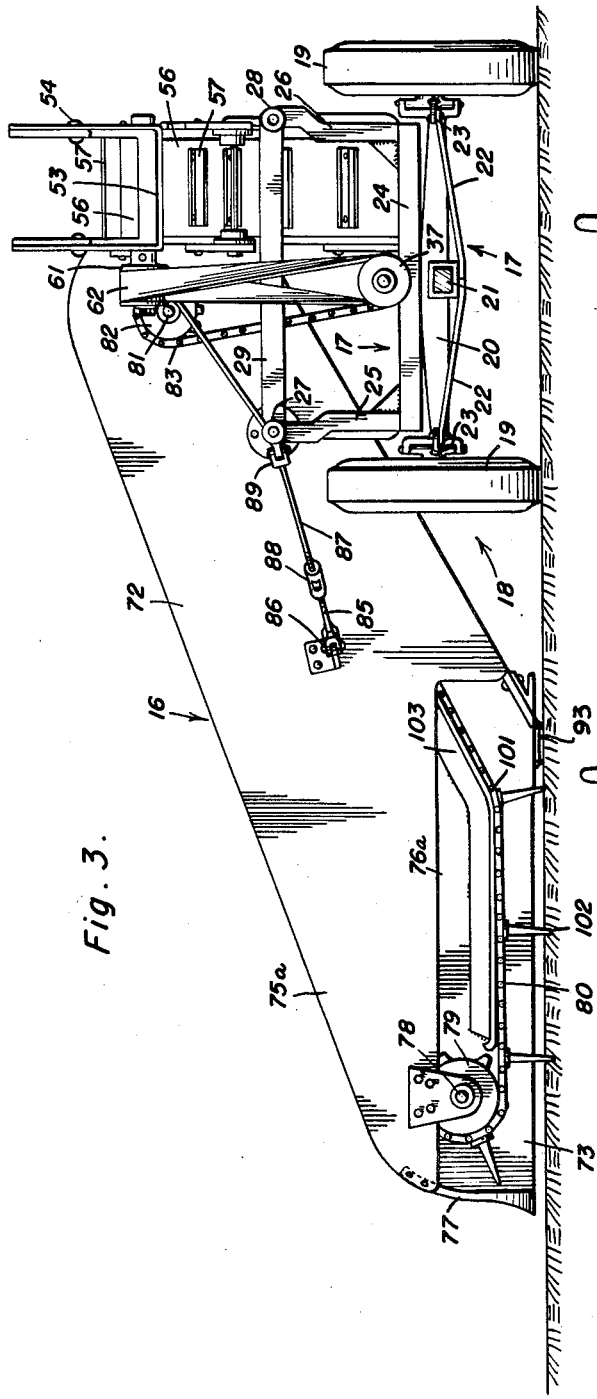

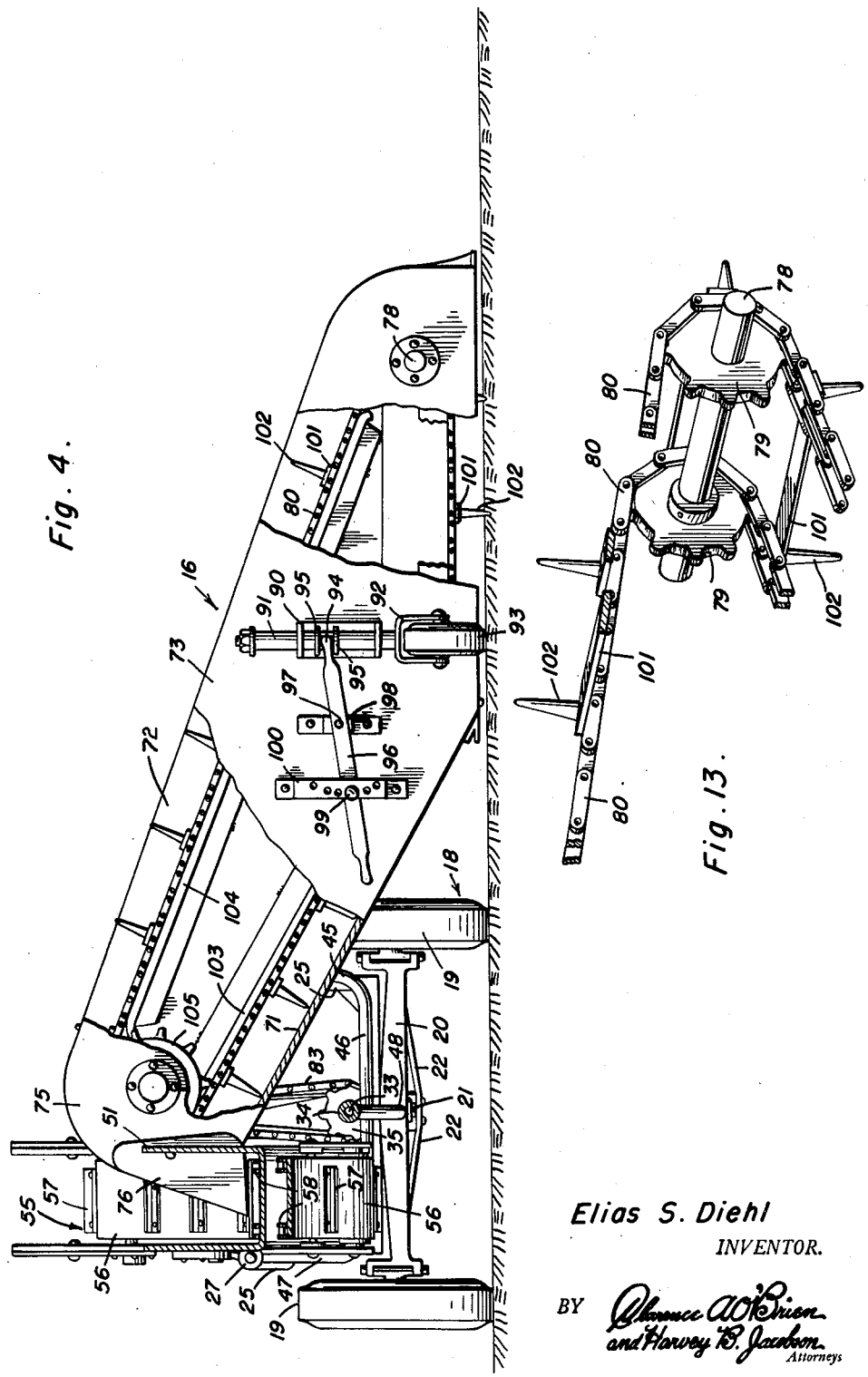

June 2, 1953
E. S. DIEHL
2,640,306
STONE GATHERING MACHINE
Filed April 11, 1949
5 Sheets-Sheet 5
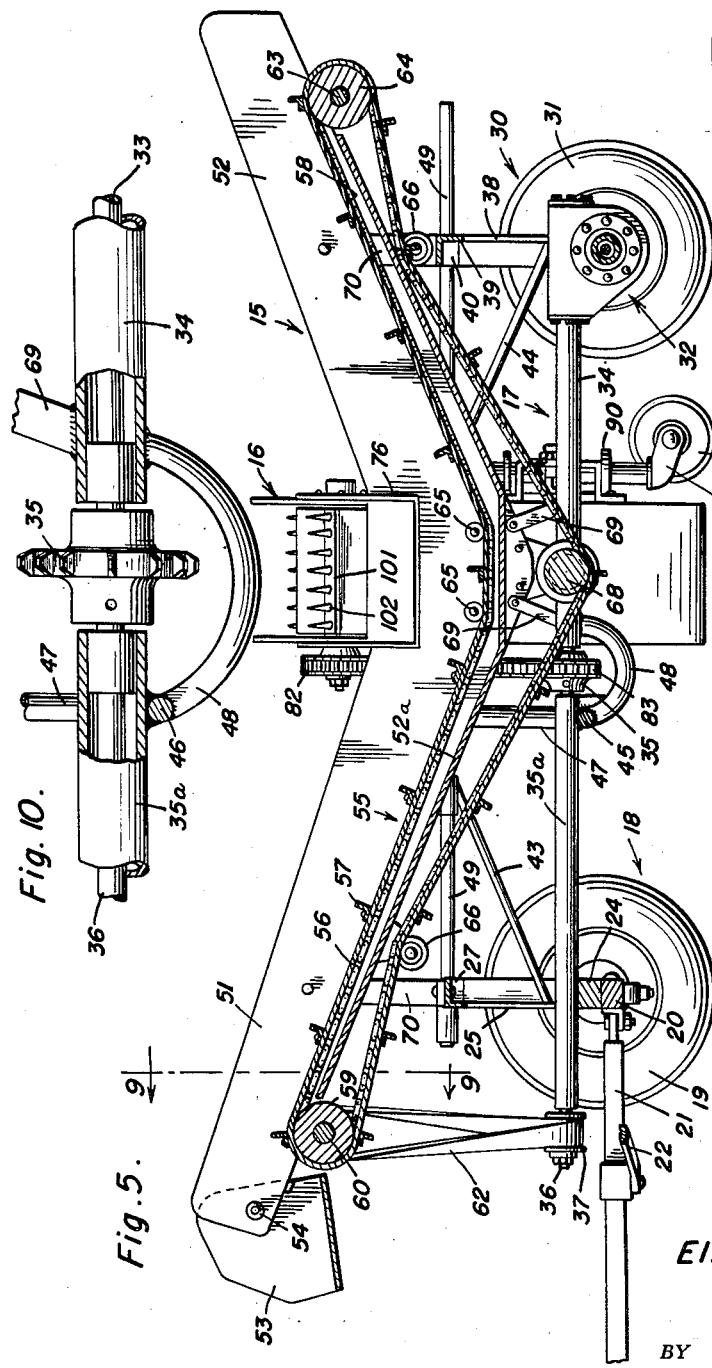
Elias S. Diehl
INVENTOR.
BY *Clarence A. O'Brien*
*and Harvey B. Jacobson*
Attorneys Patented June 2, 1953

2,640,306

UNITED STATES PATENT OFFICE 2,640,306

STONE GATHERING MACHINE

Elias S. Diehl, Bedford, Pa.

Application April 11, 1949, Serial No. 86,614

8 Claims. (Cl. 55—17)

The present invention relates to stone gatherers, that is, portable suitably propelled machines used for clearing farm land of loose stones and equivalent surface objects and to better condition the ground for planting, and the primary object of the invention is to structurally, functionally and otherwise improve upon wheeled gatherers by providing a readily usable and operable machine which may be hooked up with a tractor, dump truck or the like, so that the latter may be employed as a powering means and also for collecting the gathered stones and so that they may be transported and dumped at a selected place of disposal.

Not only is my improved stone gathering machine novel as an over-all structural entity, it is distinct in that it is possessed of appreciable structural refinements and special adaptations contributing their proportionate shares to the development of a practical machine which aptly fulfills the requirements of the trade and assures attainment of the desired end results by way of satisfactory means not found, as far as I have been able to ascertain, in competitive machines in the same line of endeavor.

Briefly and broadly comprehended, the structure providing the preferred embodiment of the invention has to do with an elongated portable support characterized by a wheel-supported readily mobile hopper which constitutes a receiver for the collected and amassed stones, the same having an endless conveyor to dump stones from either end of the hopper and an inclined stone gathering and pick-up elevator disposed at right angles to said hopper and embodying an elevator-type chute whose intake end is wheeled along close to the surface traversed, said chute having endless conveyor means to take in and lift the stones and having its discharge end emptying into the hopper.

It is an object of the invention to provide a trough-like open-ended hopper of general V-shaped form in side elevation, there being an endless apron operable in the hopper, whereby the collected stones are emptied at a central point in the hopper and then discharged, according to the movement of the conveyor, at whichever end the operator chooses for use.

Another objective of the invention, structurally pictured, invokes the use of the stated hopper and aforementioned gathering chute, the latter being at right angles to the longitudinal axis of the hopper and being downwardly and outwardly inclined and having an especially constructed intake end which is wheeled, close to the ground and, while being thus moved, the stones disposed in said intake end are raked, elevated in said chute and emptied into said hopper for subsequent disposal.

A still further object of the invention is to utilize a wheeled chassis or equivalent carriage with steering wheels at the front and with differential means at the rear, differential means operating a propeller shaft which is employed to deliver power to the cooperating endless conveyors, one in the stated hopper and the other in the complemental chute.

Other objects and advantages will become more readily apparent from the following description and the accompanying illustrative drawings.

In the accompanying drawings, wherein like numerals are employed to designate like parts throughout the views;

Figure 1 is a full top plan view of a stone gathering machine constructed in accordance with the principles of the instant invention;

Figure 2 is a side elevational view of the machine shown in Figure 1;

Figure 3 is a front end elevational view, that is, a view observing the illustration in Figures 1 and 2 in a direction from right to left;

Figure 4 is a view with parts broken away taken vertically on the line 4—4 of Figure 2.

Figure 5 is a longitudinal sectional view taken on the plane of the line 5—5 of Figure 1, looking in the direction of the arrows;

Figure 6 is a fragmentary view on an enlarged scale of the conveyor belt or stated endless conveyor which is used in the construction of the aforementioned hopper;

Figure 7 is a bottom plan view of the structure seen in Figure 6;

Figure 8 is an enlarged view with parts broken away showing the forward end portion of the motion transmitting or drive shaft;

Figure 9 is an enlarged cross-section on the line 9—9 of Figure 5, looking in the direction of the arrows;

Figure 10 is an enlarged view with parts broken away, the view being of a fragmentary type, showing the central portion of the stated drive shaft;

Figure 11 is a similar cross-section on an enlarged scale through the forward portion of the hopper, the section being on the line 11—11 of Figure 2, looking in the direction of the arrows;

Figure 12 is an enlarged fragmentary view of a portion of the conveyor in the pick-up and gathering elevator or chute.

Figure 13 is a fragmentary perspective view of a portion of the conveyor means embodied in the stone gathering chute.

By way of introduction to the detailed description and briefly summarized there is revealed herein a stone gathering and dumping machine which, generally construed, is characterized by a horizontally elongated frame structure, carriage wheels operatively mounted on and supporting the respective ends of said frame structure, an elongated hopper disposed directly above and rigidly supported by said frame structure and designed to receive stones to be disposed of, said hopper being a trough which is V-shaped in side elevation, said trough being constantly open at its respective ends to permit the stones which have accumulated therein to be dumped by way of either open end, conveyor means operatively mounted in said trough and conformable in shape with the shape of the latter, said conveyor means being selectively movable toward either open end of said trough and having operating connection with the carriage wheels at one end of said frame structure, a stone pick-up and gathering elevator comprising a chute, the latter disposed at right angles to the longitudinal axis of said trough, said chute having one end elevated, communicating with the vertex portion of said trough and hingedly attached to said trough midway between the ends of the trough, said chute extending outwardly beyond and inclining downwardly from said trough and the other end of said chute being horizontally elongated and having a flat bottom which is adapted to ride in generally spaced parallelism in respect to the surface over which it is adapted to move, said chute having vertically disposed leading and trailing walls and said leading wall having a stone inlet opening of a length commensurate with said elongated flat bottom, conveyor chain means mounted for operation in said chute and having one end portion thereof cooperating with said opening, and the other end portion cooperating with the elevated end of the chute, stone rakes carried by and cooperating with said chain means and serving to rake the stones from the stated surface and to convey them upwardly by way of said chute and to discharge them into said trough for subsequent handling in the latter, means for transmitting motion to said chains, a caster wheel swivelly and adjustably mounted for operation on the trailing wall of said chute.

Referring to the drawings by distinguishing numerals and lead lines, it will be seen that the hopper is denoted by the reference numeral 15, that the stone gathering elevator or chute is denoted by the reference character 16 and that the portable support or frame structure with its fore and aft carriage wheels is denoted by the numeral 17.

The portable support or frame structure, generally viewed, embodies a front wheel assembly, (see Figure 5) denoted generally by the numeral 18 and including steerable ground contacting wheels or carriage wheels 19 mounted by way of suitable knuckle joints on the outer ends of a transverse axle 20. Hingedly connected with the axle is a draft tongue 21 and suitable links 22 serve to connect the knuckle arms 23 (see Figure 1) with the draft tongue.

Reference being had at this stage to the front end elevation in Figure 3 it will be seen that the numeral 24 denotes a bolster which is suitably mounted on the axle 20 and which is provided at its opposite outer ends with uprights or posts 25 and 26, respectively, having eyes 27 and 28 on their upper ends. The numeral 29 designates a horizontal cross brace between the eyes on the respective posts 25 and 26.

Referring to the rear wheel assembly this is denoted, generally speaking, by the numeral 30, the same being characterized by ground-engaging or carriage wheels 31 which, through suitable axle operating connections drive differential gearing (not shown) in the differential power delivery housing or casing 32 as shown in Figure 5. The drive shaft, which is connected with the gearing is denoted by the numeral 33 (see Figure 10) mounted in a tubular casing 34 provided with suitable bearings, said drive shaft carrying a sprocket wheel 35 and the portion of the shaft to the left of the sprocket being rotatable in a suitable housing or casing 35a, said shaft section denoted at 36 and being provided on its forward end with a suitable pulley 37. The casing 35a is suitably supported on the front wheel assembly and preferably welded to the bolster 24, as shown in Figure 5. The numerals 38 at the right in Figure 5 designate uprights or posts connected by a cross-piece 39 and provided with eyes 40.

Referring at this stage to Figure 2, I call attention to the numerals 41 and 42 which denote complemental horizontal rods which have their ends mounted in the eyes 27 and 40, respectively. The numerals 43 and 44 designate diagonal braces which are connected with the posts or uprights 25 and 38 as shown in Figure 5 and also are connected with the rod sections 41 and 42. The numeral 45 designates a vertically depending brace which is connected with the rod 41 and which bends horizontally and extends beneath the drive shaft casing as at 46. It then extends to the left of said drive shaft as shown at 47 in Figure 4 where it is connected with the left-hand side of the hopper as shown. Reference being had at this time to Figure 10, a suitable brace 48 serves to connect the adjacent ends of the shaft housings 34 and 35a together, this for stability, as is obvious. Opposed to the rods 41 and 42 and on the opposite side of the hopper is a one-piece rod 49 which extends the full length of the hopper, or substantially so, as shown in Figure 1. The numerals 50 designate suitable diagonal braces for the stated rod 49. These rods 41, 42 and 49 form the framework which is supported by the front and rear wheel assemblies and which provides a satisfactory foundation for the hopper 15 and gathering chute unit 16.

The hopper comprises an elongated substantially V-shaped trough including forwardly and rearwardly diverging sections 51 and 52, respectively. These sections include side walls in parallelism and integral with a connecting web or bottom denoted by the numeral 52a. On the forward end of the trough I provide a suitable U-shaped discharge member 53 pivotally mounted in place at 54. It may be stated here that while the entire machine may be pulled by a tractor which is connected with the draft tongue 21, it is possible to hook the draft tongue to a dump truck or similar conveyance with the body of the truck directly beneath the emptying member 53, whereby to assist in "pouring" the stones into the truck body.

At this stage I call attention to the fact that the trough-like part of the hopper includes as an essential part an endless conveyor denoted by the numeral 55. This comprises an apron 56 with suitable angular flights 57 attached to said apron. Endless sprocket chains 58 are connected to the inner opposed surfaces of the apron and these sprocket chains are driven by sprocket wheels 59 on a driven shaft 60 carrying a pulley 61 operable by a twisted motion transmitting belt 62 which takes its power from the aforementioned pulley 37. At the opposite end of the hopper, that is, to the right in Figure 5, a transverse shaft 63 is suitably mounted and carries a drum 64 which idles and serves to properly support the conveyor for correct traveling. Guide rollers are provided on the interior as at 65 in Figure 5. Additional slack take-up rollers 66 are also provided and these are carried by hanger brackets 67 on the side walls of the trough. There is also a centrally disposed guide and slack take-up roller 68 mounted on appropriate hanger brackets. Incidentally, the numerals 69 designate braces which are attached to the shaft housings and also to the trough construction for stabilizing the overall construction. I also call attention to further braces 70 which are secured to the opposite side walls of the trough sections 51 and 52, on both sides and are, in turn, connected to the front and rear uprights embodied in said framework. By these braces the entire trough is properly and rigidly connected to the underlying framework and the framework is carried on the wheel supported chassis. Perhaps the "chassis" may be considered as equivalent with a carriage, that is a wheel supported carriage including an appropriate framework on which the V-shaped trough is rigidly mounted. The wheel supported trough, including the endless conveyor means constitutes a portable hopper for receiving the stones and then subsequently dumping the same from either end, depending on the direction of rotation of the conveyor means. It is sometimes desirable to dump the stones from the forward end of the hopper into a wagon which is attached to the draft tongue. Sometimes it is desirable to simply hook a tractor to the draft tongue and to connect a wagon to the trailing end of the stone gatherer so that the stones may be dumped from the latter into the wagon or truck as the case may be.

So far, and as evidenced in the detailed description, I have covered a V-shaped trough rigidly mounted on a framework carried by a steerable carriage and incorporating endless conveyor means and defining, unitarily considered, a portable hopper. I have used the expression "hopper" because of the resemblance of this part of the machine to wheel-supported coal hoppers such as are used on railways. The conveyor means receives its motion from gearing embodied in the rear wheel assembly, the rear wheels being driven by contact with the ground and the gearing serving to transmit motion to the shafting which, in turn, drives the pulleys and belt means for actuating the conveyor arrangement.

Taking up now the unit of the overall construction which I have referred to broadly as the stone gathering elevator-type chute 16, this also includes a trough or chute proper which embodies, as shown particularly in Figure 4, a bottom 71 and upstanding leading and trailing walls 72 and 73, respectively. These side walls are shown in Figures 1 and 2 and are provided with sockets 74 which receive the adjacent inner ends of the aforementioned frame rods 41 and 42. It follows that the entire chute is tiltably or rockably mounted on said rods 41 and 42. The discharge or upper end of the chute empties into the central or crotch portion of the hopper as indicated at 75 in Figure 4. Specifically, the adjacent side wall of the hopper has a notch to accommodate the coacting end portion 75 of the chute and also has wings 76 which serve as shields or guards and provide an effective connection between the two troughs, permitting the trough of the unit 16 to be at right angles to the trough portion of the unit 15. Referring to the intake or lower end portion of the chute, this is horizontally elongated as denoted at 75a in Figure 3 and the forward wall 72 has an elongated intake opening 76a provided for free entrance of the stones and other objects which are to be raked in and gathered. The transverse or outer end wall 77 has a suitably rounded leading surface so that it functions as a sort of a drag shoe and effectively clears the surface of the ground. In practice the slot or opening 76a may be some six feet or so to cover a considerable area during the stone gathering operation. It will also be observed that this portion 75a which takes in the stones is in close lying relation or proximity to the ground that it sweeps and ranges over a considerable area for effective results. Once the stones are swept in to the chute by way of the intake opening 76a they are not only concentrated but are acted on by endless conveyor means which serves as an elevator. In this connection, the numeral 78 designates a cross-shaft having sprocket wheels 79 to accommodate sprocket chains 80 and the numeral 81 designates another transverse shaft having sprocket wheels thereon for the stated sprocket chains and also having, on its exterior end a power delivery sprocket wheel 82 to accommodate a sprocket chain 83 which receives its power from the aforementioned centrally arranged sprocket wheel 35 (see Figure 10). Thus, the drive shaft made up of shaft sections 33 and 36 serves not only to drive the pulley which, in turn, drives the conveyor means in the hopper but serves also to operate the sprocket chain means which operates the conveyor structure in the chute unit 16.

I call attention at this time to Figure 1 wherein the numeral 84 designates an adjustable truss arrangement comprising a rod 85 hingedly connected at 86 to the central part of the trough wall 72. A similar rod 87 is provided and connected with the first rod by a turnbuckle 88 and said rod 87 is hingedly connected at 89 to the front wheel assembly, or rather to the post 25 of said assembly as shown in Figure 3.

It has been noted that the chute 16, running at right angles to the longitudinal axis of the wheeled hopper 15 is hingedly mounted intermediate its ends and has its discharge end emptying into the median or crotch portion of the hopper. The intake end, in order to effectively pick up and amass the stones has a horizontal portion which is substantially parallel to the surface. However, this portion has to conform to irregular contours and to avoid difficulties and to assist in proper movement of the chute it is partly supported on a caster. As shown for example in Figure 4 the rear wall of the chute is provided with a fixedly mounted U-shaped bracket 90 in which a vertically liftable and lowerable shaft 91 is slidable. The shaft is provided at its lower end with a fork 92 carrying the caster wheel 93. A smaller fork 94 is provided and the arms of said fork straddle the vertical shaft 91 between the flanges 95. The fork 94 is on a lever 96 pivoted at 97 on a hanger bracket 98. The handle portion of the lever is adjustably pinned as at 99 in a suitably apertured and mounted holder 100.

Reverting to the conveyor means in the chute it will be seen that the conveyor chains are provided with cross plates 101 having a plurality of stone rakes or teeth 102. These teeth rake along the bottom 71 as shown in Figure 1 and thus "comb" through the loose material and dirt and rake the stones up the incline or bottom 71 where they are dumped into the hopper. Suitable tracks 103 and 104 are provided (see Figure 4) for the endless chains 80. I have described that the chains are trained over sprocket wheels 79 at the lower end of the chute and I might also mention that the upper ends of the chains are trained over sprockets 105 on the sprocket wheel shaft 81.

It is obvious, in operation, that the lower intake end of the chute is elevated to the desired distance above the surface of the ground to be raked and the distance is gauged and maintained through the medium of the caster wheel 93 after the latter is properly set. Naturally as the chute trundles along, thus nicely supported, the upper end portion bobs up and down on the aforementioned pivotal connections afforded between 74 and 41 and 42, respectively (see Figure 2). The stones are virtually scraped loose and are pocketed in the collecting or gathering chamber provided therefor, making their entry through the elongated slot or opening 76a. They are then caught by the traveling rakes on the endless conveyor chain and are dragged up the bottom or ramp 71 and are delivered into the hopper. The conveyor means just referred to receives motion from the sprocket chain 83 driven by the sprocket wheel 35 on the drive shaft. The drive shaft takes its motion from the differential embodied in the rear wheel assembly of the chassis. The same shaft, as before stated, drives the pulleys 37 and 61 by way of the belt 62, thus operating the conveyor means in the V-shaped hopper. The belt may be twisted to run the conveyor means in one direction and untwisted and run evenly to operate the conveyor means in an opposite direction. This makes it possible to feed the collected stones out from either end of the hopper. As previously stated, the wagon or truck which accumulates the batch of stones may be hitched to the front of the gatherer or may be coupled up to trail said gatherer depending on requirements.

While I have shown all of the essential details and parts which coordinate to provide a complete machine, it is obvious that I am primarily concerned with a longitudinally elongated V-shaped trough with endless conveyor means operably mounted therein, said trough constituting a hopper and being supported on a wheel supported frame structure. This means is necessary to provide proper operating connections and braces between the stated trough or hopper and the carriage. In carrying out my ideas I have found that it is expedient and practicable to provide a carriage which has elevated rails providing a framework to assist in mounting the trough and prefer to use a rear wheel assembly with ground-contacting or carriage wheels for operating gearing, the gearing, in turn, serving to operate a propeller shaft with pulley means at one end and the sprocket means intermediate its ends. Added to this broad adaptation is a side delivery gathering chute which rolls along, adapts itself to uneven contours in the surface, pockets and accumulates the stones and then rakes same up the ramp-like bottom into the hopper.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. An apparatus for picking up, gathering, transporting and dumping the gathered stones into wagons or the like comprising a portable support embodying wheel supported frame structure adapted to be drawn over a stony surface and including a self-unloading loose stone receiving and dumping hopper fixedly mounted on said frame structure, said hopper embodying a longitudinally elongated trough which is open at opposite ends, conveyor means embodied in said trough, said hopper being adapted to move in approximate alignment with the line of draft and to one side of the path which is to be cleared of loose stones, a loose stone pick-up, gathering, and elevating chute disposed at right angles to the line of draft and movable along the loose stone path, the discharge end of said chute communicating with and emptying into the intermediate portion of said hopper, said chute being independent of said hopper, being solely and hingedly supported on and carried by said frame and self-tilting relative to the surface traversed, an endless conveyor means in said chute, said chute having an opening at its outer end to take in stones, said opening being located on the leading side of the chute, means on said frame structure for simultaneously operating the conveyor means in the hopper and chute, and manually adjustable caster means carried by the outward end portion of said chute.

2. A stone gathering machine of the class described comprising a portable support, a hopper rigidly mounted directly above and movable with said support, said hopper embodying an elongated trough, said trough being open at its opposite ends and, when in motion with said support, being adapted to travel in parallelism and alignment with the line of draft, conveyor and dumping means mounting said conveyor means for operation within the confines of said trough, and a stone pick-up and gathering elevator at right angles to the line of draft and in communication at one end with the intermediate portion of said hopper, said stone gathering elevator being independent in respect to and pivotally mounted adjacent to said one end on said support and having conveyor means operatively mounted therein, and a caster adjustably mounted for operation on the trailing side of the intake end portion of said gathering elevator.

3. The structure specified in claim 2, wherein said trough is substantially V-shaped in side elevation and said one end of the stone gathering elevator is lined up to deliver the elevated stones into the vertex portion of the trough.

4. A stone gathering machine of the class described comprising a portable support embodying a frame structure, carriage wheels therefor, wheels being mounted at opposite ends of said frame structure, a stone receiving and dumping hopper mounted directly above and in alignment with said frame structure, conveyor means mounted, in part, for operation in said hopper, an operating connection between certain of said carriage wheels and said conveyor means, a stone pick-up and gathering elevator disposed in a downwardly and outwardly inclined position relative to said hopper and comprising a chute at right angles to said hopper, said chute having leading and trailing walls and one end portion of said leading wall having an opening for gathering and feeding stones into said chute, means hingedly mounting said chute on said frame structure, the axis of said means being horizontal and parallel to the longitudinal axis of said hopper one end of said chute being in communication with the intermediate portion of said hopper, ground contacting and chute supporting means mounted on and carried by the other end of said chute, conveyor chains mounted for operation in said chute, stone rakes mounted on said conveyor chains, and an operating connection between the chains and said carriage wheels.

5. The structure defined in claim 4, wherein said other end of said chute is elongated and is provided with a substantially flat bottom portion which is adapted to ride in close spaced parallelism with the surface traversed.

6. The structure defined in claim 4, wherein said other end of said chute is elongated and is provided with a substantially flat bottom portion which is adapted to ride in close spaced parallelism with the surface traversed, and wherein said opening is of a length commensurate with the length of said elongated end.

7. The structure defined in claim 4, wherein said ground contacting and supporting means comprises a caster wheel, means for swivelly mounting the same on the trailing side of said chute, means for raising and lowering the caster wheel relative to the chute, and means mounted on the chute for locking the caster wheel in a given elevated position.

8. A stone gathering and dumping machine comprising a horizontally elongated frame structure, carriage wheels operatively mounted on and supporting the respective ends of said frame structure, an elongated hopper disposed directly above and rigidly supported by said frame structure and designed to receive stones to be disposed of, said hopper being a trough which is V-shaped in side elevation, said trough being constantly open at its respective ends to permit the stones which have accumulated therein to be dumped by way of either open end, conveyor means operatively mounted in said trough and conformable in shape with the shape of the latter, said conveyor means being selectively movable toward either open end of said trough and having operating connection with the carriage wheels at one end of said frame structure, a stone pick-up and gathering elevator comprising a chute, the latter disposed at right angles to the longitudinal axis of said trough, said chute having one end elevated, communicating with the vertex portion of said trough and hingedly attached to said trough midway between the ends of the trough, said chute extending outwardly beyond and inclining downwardly from said trough and the other end of said chute being horizontally elongated and having a flat bottom which is adapted to ride in generally spaced parallelism in respect to the surface over which it is adapted to move, said chute having vertically disposed leading and trailing walls and said leading wall having a stone inlet opening of a length commensurate with said elongated flat bottom, conveyor chain means mounted for operation in said chute and having one end portion thereof cooperating with said opening, and the other end portion cooperating with the elevated end of the chute, stone rakes carried by and cooperating with said chain means and serving to rake the stones from the stated surface and to convey them upwardly by way of said chute and to discharge them into said trough for subsequent handling in the latter, means for transmitting motion to said chains, a caster wheel swivelly and adjustably mounted for operation on the trailing wall of said chute.

ELIAS S. DIEHL.

References Cited in the file of this patent

UNITED STATES PATENTS

| Number | Name | Date |
|---|---|---|
| 516,857 | Bailey | Mar. 20, 1894 |
| 614,137 | Seitz | Nov. 15, 1898 |
| 1,078,234 | Wickoff | Nov. 11, 1913 |
| 1,081,124 | Kulhanek | Dec. 9, 1913 |
| 1,241,880 | Penington | Oct. 2, 1917 |
| 1,555,777 | Van De Genachte | Sept. 29, 1925 |
| 1,593,952 | Ribbans | July 27, 1926 |
| 2,413,355 | Johnson | Dec. 31, 1946 |

FOREIGN PATENTS

| Number | Country | Date |
|---|---|---|
| 546,328 | Great Britain | July 7, 1942 |